(12) United States Patent
Uchikawa

(10) Patent No.: US 8,599,459 B2
(45) Date of Patent: Dec. 3, 2013

(54) IMAGE DISPLAY APPARATUS

(75) Inventor: Daisuke Uchikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/284,895

(22) Filed: Oct. 29, 2011

(65) Prior Publication Data

US 2012/0039347 A1 Feb. 16, 2012

Related U.S. Application Data

(63) Continuation of application No. 12/406,437, filed on Mar. 18, 2009.

(30) Foreign Application Priority Data

Apr. 1, 2008 (JP) ................................. 2008-094757

(51) Int. Cl.
*G02B 26/08* (2006.01)
(52) U.S. Cl.
USPC .................. 359/201.1; 359/202.1; 359/212.1
(58) Field of Classification Search
USPC .......... 359/201.1–202.1, 212.1, 212.2, 220.1, 359/221.1, 223.1, 225.1, 226.2, 867, 872; 353/98–100
See application file for complete search history.

(56) References Cited

U.S. PATENT DOCUMENTS

| | | | |
|---|---|---|---|
| 4,413,180 A | 11/1983 | Libby | |
| 5,365,288 A | 11/1994 | Dewald et al. | |
| 5,903,386 A | 5/1999 | Mantravadi et al. | |
| 6,128,131 A * | 10/2000 | Tang | 359/443 |
| 6,547,397 B1 | 4/2003 | Kaufman et al. | |
| 6,764,183 B2 | 7/2004 | Okazaki | |
| 7,264,360 B2 | 9/2007 | Hatakeyama et al. | |
| 7,357,512 B2 | 4/2008 | Tan et al. | |
| 7,367,682 B2 | 5/2008 | Dvorkis et al. | |
| 7,377,656 B2 * | 5/2008 | Nojima et al. | 353/77 |
| 7,440,158 B2 * | 10/2008 | Giles et al. | 359/279 |
| 7,489,714 B2 * | 2/2009 | Park et al. | 372/20 |
| 7,502,160 B2 * | 3/2009 | Aksyuk et al. | 359/290 |
| 7,614,752 B2 | 11/2009 | Goto et al. | |
| 7,701,412 B2 | 4/2010 | Lee et al. | |
| 7,845,801 B2 | 12/2010 | Slutsky | |

(Continued)

FOREIGN PATENT DOCUMENTS

| | | |
|---|---|---|
| JP | 2004-252012 A | 9/2004 |
| JP | 2005-352488 A | 12/2005 |
| JP | 2008-139886 A | 6/2008 |
| JP | 2009-025463 A | 2/2009 |
| WO | 2005/078519 A1 | 8/2005 |

OTHER PUBLICATIONS

Kerigan et al., "Perceived Speckle Reduction in Projection Display Systems", IBM Tech. Discl. Bull., vol. 40, No. 7, pp. 9-12, Jul. 1, 1997.*

(Continued)

*Primary Examiner* — Frank Font
(74) *Attorney, Agent, or Firm* — Maschoff Brennan

(57) ABSTRACT

An image display apparatus that displays an image by scanning of coherent light includes: a light source portion that emits the coherent light; a scanning portion that scans the coherent light; a concave reflection portion having a concave surface from which the coherent light is reflected; and an incident position changing unit that changes an incident position of the coherent light onto the concave surface in a curvature direction of the concave surface.

5 Claims, 12 Drawing Sheets

(56) References Cited

U.S. PATENT DOCUMENTS

| | | |
|---|---|---|
| 8,109,638 B2 * | 2/2012 | Chen et al. ............... 353/31 |
| 2003/0030923 A1 | 2/2003 | Hsu et al. |
| 2006/0028622 A1 * | 2/2006 | Nojima et al. ............ 353/75 |
| 2007/0121682 A1 * | 5/2007 | Ichikawa et al. ............ 372/9 |
| 2008/0130077 A1 | 6/2008 | Park et al. |
| 2008/0143888 A1 * | 6/2008 | Chilla et al. ............ 348/759 |
| 2009/0185251 A1 * | 7/2009 | Chen et al. ............ 359/199.3 |

OTHER PUBLICATIONS

Office Action dated Jul. 27, 2011 as received in related U.S. Appl. No. 12/406,437.

* cited by examiner

IMAGE DISPLAY APPARATUS

CROSS-REFERENCE TO RELATED APPLICATIONS

This application is a continuation of U.S. patent application Ser. No. 12/406,437, filed Mar. 18, 2009, which claims the benefit of Japanese patent application no. 2008-094757, filed Apr. 1, 2008. The foregoing applications are incorporated herein by reference.

BACKGROUND

1. Technical Field

The present invention relates to an image display apparatus and in particular, to a technique of an image display apparatus that displays an image using a laser beam.

2. Related Art

A technique of using a laser light source as a light source of an image display apparatus, such as a projector, has been recently proposed. As compared with a UHP lamp that has been used as a light source of a projector in the related art, the laser light source is advantageous in high color reproducibility, instant lighting, a long life, and the like. Moreover, since loss of energy is low and luminous efficiency is high compared with the UHP lamp, it is also considered that the laser light source is effective in reducing the power consumption of the image display apparatus.

An example of an image display apparatus that uses a laser light source includes an image display apparatus that displays an image by scanning a laser beam, which is coherent light, with a light scanning device and making the laser beam irradiated onto an irradiated surface, such as a screen. When the laser beam is irradiated onto the irradiated surface, an interference pattern called a speckle pattern in which bright points and dark points are randomly distributed may appear.

The speckle pattern is a dynamic brightness pattern (also called a speckle noise) occurring due to random interfere of light beams diffused at points of a diffused surface. Since the speckle pattern is recognized as fine particle shaped glare to human eyes, the speckle pattern greatly lowers the display quality of an image. For this reason, it is necessary to take measures against the speckle noise in case of using a laser light source.

In order to reduce the speckle noise, for example, International Publication No. 2005/078519 pamphlet proposes a technique of rocking an optical path of a laser beam irradiated onto an irradiated surface. In the technique proposed in International Publication No. 2005/078519 pamphlet, the speckle noise is reduced by shifting irradiated positions of laser beams on the irradiated surface by rocking of the optical path so that a plurality of speckle patterns are superimposed.

However, when the irradiated positions of laser beams on the irradiated surface are shifted, the image may be recognized as a vibrating image or a blurred image due to the shift. As a result, the display quality of the image may lower on the contrary.

SUMMARY

An advantage of some aspects of the invention is that it provides an image display apparatus capable of effectively reducing a speckle noise and displaying a high-quality image by changing a speckle pattern while suppressing deviation of an irradiated position of a laser beam on an irradiated surface.

According to an aspect of the invention, an image display apparatus that displays an image by scanning of coherent light includes: a light source portion that emits the coherent light; a scanning portion that scans the coherent light; a concave reflection portion having a concave surface from which the coherent light is reflected; and an incident position changing unit that changes an incident position of the coherent light onto the concave surface in a curvature direction of the concave surface.

The curvature direction of the concave surface is a direction in which the curvature of the concave surface is given. As the incident position changes in the curvature direction of the concave surface, an angle of reflection of coherent light also changes. By changing the incident position of the coherent light onto the concave surface, the incident angle of the coherent light onto the irradiated surface, such as a screen, is changed. The change in the incident angle of coherent light generates a plurality of speckle patterns. By making the plurality of speckle patterns superimposed on a viewer's retina, a specific speckle pattern cannot be recognized and a speckle noise can be reduced.

In addition, coherent light components reflected at different positions of the concave surface can be concentrated on the irradiated surface by making the reflecting surface as a concave surface. By making the coherent light concentrate on the irradiated surface, the incident angle of light onto the irradiated surface is changed without almost changing the irradiated position of the coherent light onto the irradiated surface. That is, by changing a speckle pattern while suppressing deviation of an irradiated position of a laser beam on an irradiated surface, it is possible to effectively reduce the speckle noise and to display a high-quality image.

Furthermore, in the image display apparatus according to the aspect of the invention, it is preferable that the incident position changing unit be a light source moving unit that moves the light source portion. The incident position of the coherent light onto the concave surface is changed with a configuration of moving a light source. Accordingly, since a new optical element for changing the incident position of coherent light is not needed, the configuration becomes simple.

Furthermore, in the image display apparatus according to the aspect of the invention, it is preferable to further include a transmission portion that is disposed on an optical path of the coherent light before being incident on the concave surface and that transmits the light therethrough. In addition, preferably, the incident position changing unit is an inclination changing unit that changes the inclination of the transmission portion with respect to the coherent light.

By refraction of the coherent light on the interface of the transmission portion, the optical path shifts. Since the change in the inclination of the transmission portion with respect to the coherent light changes the shift amount of the optical path, the incident position of the coherent light onto the concave surface can be changed. Since the transmission portion changes the optical path of the coherent light using refraction of light, an electric wiring line is not required for the transmission portion itself. Accordingly, since there is no possibility that a wiring line will be disconnected by the change in the inclination of the transmission portion, the reliability of the image display apparatus can be secured.

Furthermore, in the image display apparatus according to the aspect of the invention, it is preferable to further include a return reflection portion that reflects the coherent light to travel to the scanning portion. In addition, preferably, the scanning portion includes the concave reflection portion and the incident position changing unit is a return reflection portion moving unit that moves the return reflection portion.

Since the optical path of the coherent light traveling toward the scanning portion including the concave reflection portion shifts with movement of the return reflection portion, the incident position of the coherent light onto the concave surface can be changed. Since the return reflection portion changes the optical path of the coherent light using reflection of light, an electric wiring line is not required for the return reflection portion itself. Accordingly, since there is no possibility that a wiring line will be disconnected by movement of the return reflection portion, the reliability of the image display apparatus can be improved.

Furthermore, in the image display apparatus according to the aspect of the invention, it is preferable that the return reflection portion be a dichroic mirror. The dichroic mirror has a characteristic of making light in a specific wavelength range reflected therefrom and light in the other wavelength range transmitted therethrough. Accordingly, using the dichroic mirror, it is possible to selectively reflect only light with a specific color (wavelength) and irradiate the light on the irradiated surface. Since the optical path of the coherent light traveling toward the scanning portion including the concave reflection portion shifts with movement of the dichroic mirror, the incident position of the coherent light onto the concave surface can be changed.

A plurality of dichroic mirrors may be provided. For example, blue light and green light can be mixed by reflecting the green light from a reflecting surface of a dichroic mirror that reflects the green light and projecting the blue light from a bottom surface side of the reflecting surface. Then, by reflecting red light from a reflecting surface of a dichroic mirror that reflects only red light and projecting light, obtained by mixing of the blue light and the green light, from a bottom surface side of the reflecting surface, three colors of red (R), green (G), and blue (B) can be mixed. As a result, a color image can be displayed. In addition, when a plurality of dichroic mirrors are provided, light components corresponding to respective colors may be mixed on an irradiated surface by concentration on the irradiated surface even if the light components are not mixed until the light components reach the irradiated surface. Accordingly, movement periods of the plurality of dichroic mirrors may not synchronize with each other.

Furthermore, in the image display apparatus according to the aspect of the invention, preferably, the scanning portion has a first scanning portion that scans the coherent light in a first direction and a second scanning portion that scans the coherent light in a second direction approximately perpendicular to the first direction at a longer period than a period at which the coherent light is scanned by the first scanning portion, and the second scanning portion includes the concave reflection portion.

Since the first and second directions are approximately perpendicular to each other, an image spreading in a two-dimensional manner can be displayed in a predetermined region (for example, on the irradiated surface). The second scanning portion scans coherent light at a longer period than a scanning period of the first scanning portion. Accordingly, for example, when the scanning portion rocks to scan the coherent light, the moment applied to the second scanning portion due to the rocking decreases. As a result, since deflection of the concave surface caused by the influence of the moment can also be reduced, the coherent light can be concentrated with high precision.

A small member (for example, a MEMS (micro electro mechanical system) mirror) is used as the first scanning portion with a short period, at which coherent light is scanned, in many cases. On the other hand, a larger member (for example, a galvanomirror) than the first scanning portion is used as the second scanning portion in many cases. Accordingly, it is easy to form the concave surface in the second scanning portion rather than the first scanning portion, and the manufacturing cost can be suppressed.

Furthermore, in the image display apparatus according to the aspect of the invention, preferably, the scanning portion has a first scanning portion that scans the coherent light in a first direction, a second scanning portion that scans the coherent light in a second direction approximately perpendicular to the first direction, and a return reflection portion within a scanning portion that reflects the coherent light reflected by the first scanning portion toward the second scanning portion, and the return reflection portion within a scanning portion includes the concave reflection portion.

Since the return reflection portion within a scanning portion itself is not related to scanning of the coherent light, it is not necessary to rock the return reflection portion within a scanning portion. Accordingly, the concave surface is not bent by rocking of the return reflection portion within a scanning portion. That is, since it can be prevented that coherent light is dispersed by bending of the concave surface, it is possible to prevent the display quality from lowering.

A larger member than the first scanning portion or the second scanning portion is used as the return reflection portion within a scanning portion, which is not related to scanning of coherent light, in many cases. As a result, since it becomes easy to form a concave surface on the return reflection portion within a scanning portion, the manufacturing cost can be suppressed.

Furthermore, in the image display apparatus according to the aspect of the invention, it is preferable that the first direction and the curvature direction of the concave surface are approximately perpendicular to each other. Since the first direction and the curvature direction of the concave surface are perpendicular to each other, an influence caused by giving the curvature can be suppressed for reflection of coherent light scanned by the first scanning portion on the concave surface. Accordingly, distortion of an image displayed on the irradiated surface can be reduced compared with a case where the first direction and the curvature direction of the concave surface are parallel.

Furthermore, in the image display apparatus according to the aspect of the invention, preferably, the scanning portion has a first scanning portion, which scans the coherent light in a first direction, and a second scanning portion, which scans the coherent light in a second direction approximately perpendicular to the first direction at a longer period than a period at which the coherent light is scanned by the first scanning portion, and the first scanning portion includes the concave reflection portion.

Since the first and second directions are approximately perpendicular to each other, an image spreading in a two-dimensional manner can be displayed in a predetermined region (for example, on the irradiated surface). As described above, a small member (for example, a MEMS mirror) is used as the first scanning portion that scans the coherent light with a shorter period than the second scanning portion in many cases. Since the concave surface is also small if the first scanning portion is small, an influence (for example, variation in the reflecting direction) caused by giving the curvature to the concave reflection portion can be suppressed.

Furthermore, in the image display apparatus according to the aspect of the invention, it is preferable to further include a return reflection portion that reflects the coherent light to travel to the scanning portion. In addition, preferably, the return reflection portion includes the concave reflection portion and the incident position changing unit is a return reflection portion moving unit that moves the return reflection portion.

The incident position of the coherent light onto the concave surface can be made to change with the movement of the return reflection portion including the concave reflection portion. Since the angle of reflection of coherent light can be made to change with the movement of the return reflection portion, the reflected coherent light can also be concentrated on the irradiated surface. Since the return reflection portion changes the optical path of the coherent light using reflection of light, an electric wiring line is not required for the return reflection portion itself. Accordingly, since there is no possibility that a wiring line will be disconnected by movement of the return reflection portion, the reliability of the image display apparatus can be secured.

In addition, since the return reflection portion is not related to scanning of the coherent light, it is not necessary to rock the return reflection portion. Accordingly, the concave surface is not bent by rocking of the return reflection portion. That is, since it can be prevented that coherent light is dispersed by bending of the concave surface, it is possible to prevent the display quality from lowering.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

First Embodiment

Figure 1:
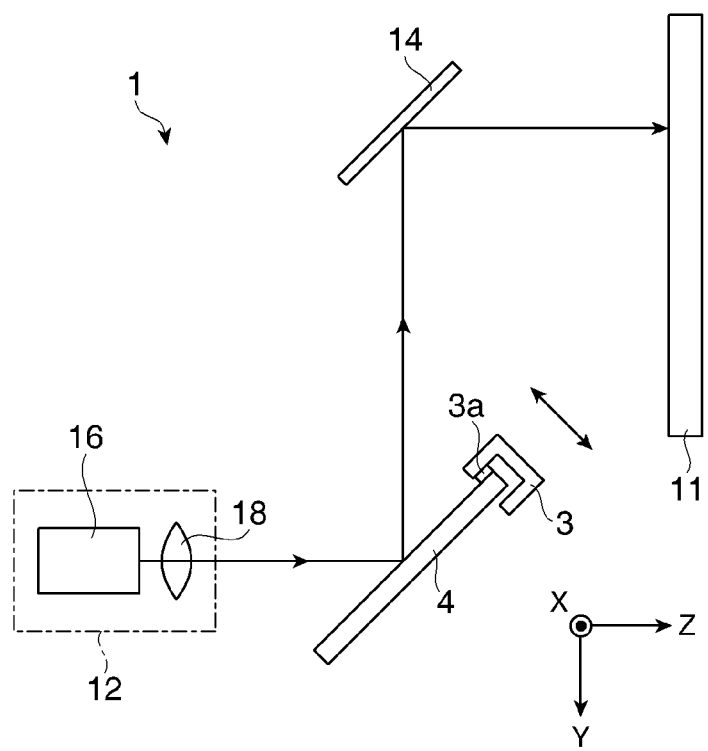
FIG. 1 is a schematic view illustrating the configuration of an image display apparatus according to a first embodiment of the invention.

FIG. 1 is a schematic view illustrating the configuration of an image display apparatus 1 according to a first embodiment of the invention. The image display apparatus 1 displays an image on an irradiated surface of a screen 11 by scanning a laser beam modulated according to an image signal. The image display apparatus 1 is configured to mainly include a light source device 12, a return mirror (return reflection portion) 4, a vibrating device (incident position changing unit, return reflection portion moving unit) 3, and a biaxial scanner (scanning portion) 14. Moreover, in the explanation of embodiments of the invention, an axis perpendicular to the screen 11 is assumed to be a Z axis. An axis that is perpendicular to the Z axis and extends horizontally is assumed to be an X axis. In addition, an axis perpendicular to the ZX plane is assumed to be a Y axis.

The light source device 12 is configured to include a semiconductor laser 16 (light source portion) and a collimator optical system 18. The semiconductor laser 16 has a function of emitting a laser beam as coherent light toward the return mirror 4. The collimator optical system 18 is provided at the position on which light emitted from the semiconductor laser 16 is incident. The collimator optical system 18 has a function of collimating laser beams emitted from the semiconductor laser 16.

For modulation according to an image signal, either amplitude modulation or pulse width modulation may be used. The image display apparatus 1 has light source devices for color light components, which correspond to red (R) light, green (G) light, and blue (B) light, and a color mixing optical system that mixes the color light components. Here, detailed explanations on the light source devices for color light component and the color mixing optical system will be omitted.

The return mirror 4 has a function of reflecting a laser beam emitted from the semiconductor laser 16 and making the laser beam travel toward the biaxial scanner 14. The vibrating device 3 shifts (converts) an optical path of the laser beam emitted from the semiconductor laser 16 by moving (vibrating) the return mirror 4. In the first embodiment, the vibrating device 3 has a piezoelectric element 3a.

The piezoelectric element 3a has a property of expanding and contracting when a voltage is applied. The return mirror 4 is moved (vibrates) by repeated application of a voltage to the piezoelectric element 3a using such a property. Since the return mirror 4 vibrates, a position of the return mirror 4 from which a laser beam is reflected on the optical path of the laser beam changes. Accordingly, the optical path of the laser beam reflected by the return mirror 4 is shifted (converted) in the Z-axis direction. By shifting the laser beam, the incident position of the laser beam onto a concave surface, which will be described later, is changed. Moreover, in the first embodiment, the vibration direction of the return mirror 4 approximately matches the normal direction of a reflecting surface of the return mirror 4. However, the vibration direction of the return mirror 4 is not limited thereto. For example, the vibration direction of the return mirror 4 may approximately match the optical path direction of a laser beam incident on the return mirror 4 or may approximately match the optical path direction of a laser beam reflected by the return mirror 4. As the vibrating device 3, not only the piezoelectric element 3a but also a motor may be used or an electrically driven vibrating device using a coil or a magnet may be used, for example.

Figure 2:
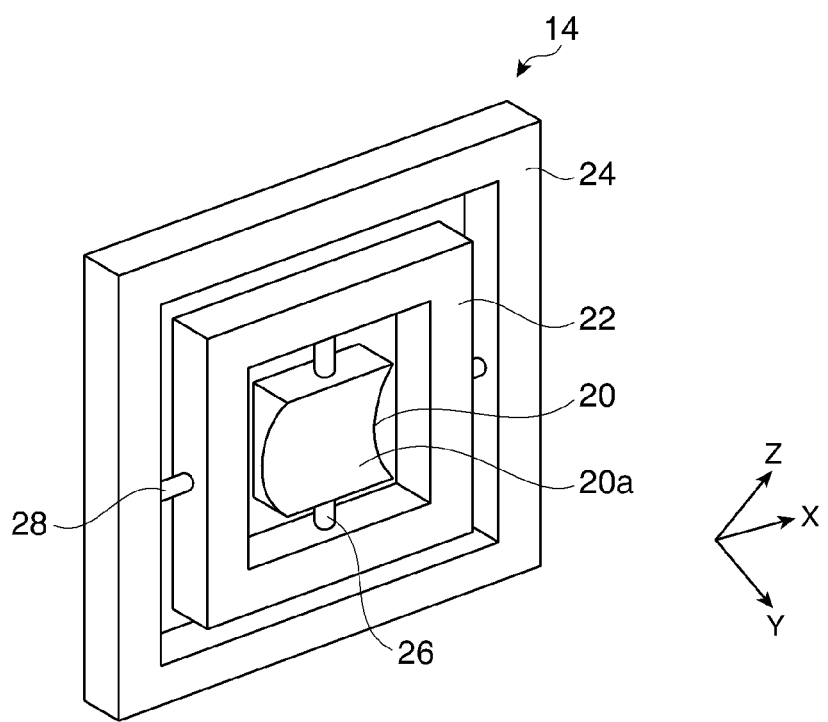
FIG. 2 is a perspective view illustrating a biaxial scanner.

FIG. 2 is a perspective view illustrating the biaxial scanner 14. The biaxial scanner 14 scans laser beams emitted from the light source device 12 in the two-dimensional direction (horizontally and vertically) on the screen 11. A biaxially movable mirror (concave reflection portion) 20 that reflects light therefrom is disposed in the middle of the biaxial scanner 14. The biaxially movable mirror 20 has a function of reflecting a laser beam, which is reflected from the return mirror 4, toward the screen 11.

The biaxially movable mirror 20 is surrounded by a first support portion 22. The first support portion 22 is surrounded by a second support portion 24. The biaxially movable mirror 20 and the first support portion 22 are connected to each other by a first torsion spring 26. The biaxially movable mirror 20 rocks with the first torsion spring 26 as a shaft. The first support portion and the second support portion 24 are connected to each other by a second torsion spring 28. The biaxially movable mirror 20 rocks with the second torsion spring 28 as a shaft. The rocking direction of the biaxially movable mirror 20 using the first torsion spring 26 as a shaft is approximately perpendicular to the rocking direction of the biaxially movable mirror 20 using the second torsion spring 28 as a shaft.

The biaxially movable mirror 20 rocks with reflection of a laser beam to thereby scan the laser beam in the two-dimensional direction on the screen 11. The biaxially movable mirror 20 rocks with the first torsion spring 26 as a shaft to thereby scan a laser beam in a horizontal direction (X-axis direction) and rocks with the second torsion spring 28 as a shaft to thereby scan a laser beam in a vertical direction (Y-axis direction). In addition, a structure of generating a driving force for driving the biaxially movable mirror 20 is omitted. As structures for driving the biaxially movable mirror 20, various structures including a structure driven by electrostatic driving, a structure driven by electromagnetic driving using an electromagnetic force, and a structure driven by using an elastic force of a piezoelectric element may be considered.

A reflecting surface 20a of the biaxially movable mirror 20 is a concave surface. The reflecting surface 20a has a cylindrical shape with a curvature in one of two directions perpendicular to each other. In the first embodiment, the curvature direction of the concave surface is the same direction as a shift direction (Z-axis direction) of a laser beam by the operation of the vibrating device 3. Alternatively, the reflecting surface 20a may be a spherical concave surface with a curvature in two directions perpendicular to each other. In this case, the shift direction of a laser beam may be any direction with a curvature. In addition, at least a part of the reflecting surface 20a may be a concave surface. That is, the entire reflecting surface 20a does not necessarily need to be a concave surface.

Figure 3:
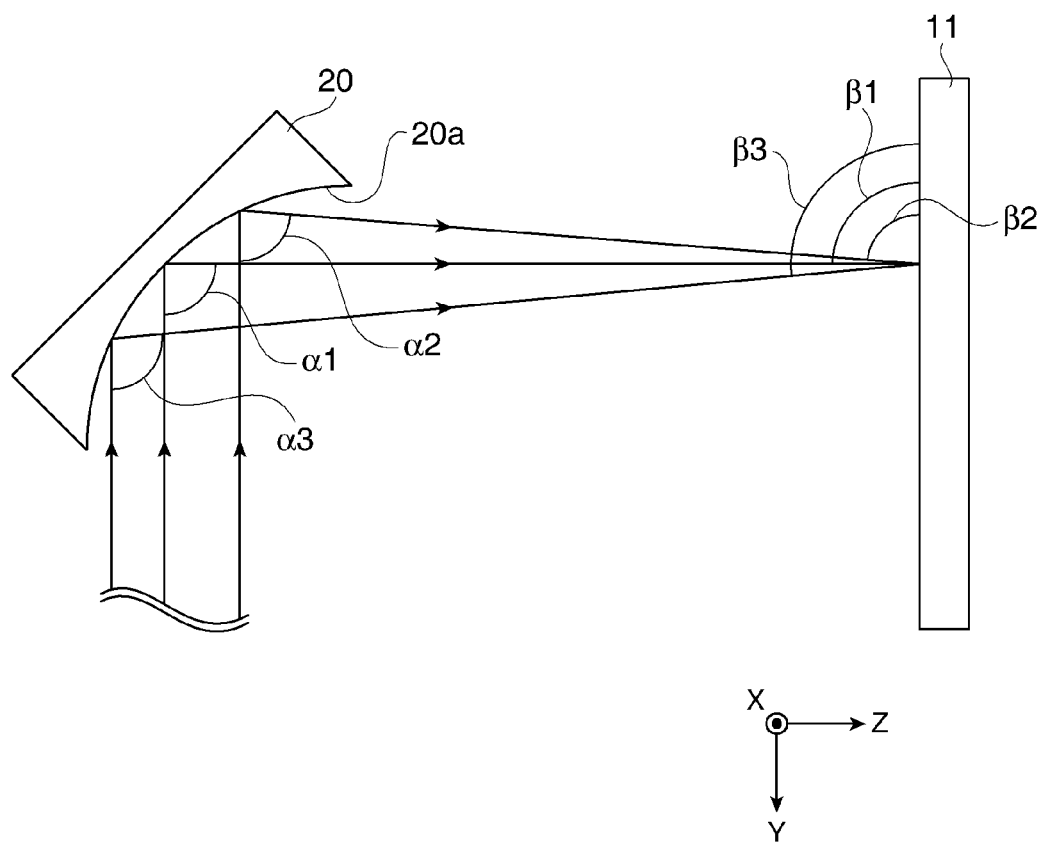
FIG. 3 is a schematic view illustrating optical paths of laser beams reflected from a reflecting surface.

FIG. 3 is a schematic view illustrating optical paths of laser beams reflected from the reflecting surface 20a. The optical paths of laser beams are shifted in the Z-axis direction since the return mirror 4 vibrates by an operation of the vibrating device 3. The incident positions of the laser beams onto the reflecting surface 20a change in the curvature direction of the concave surface with the shift of the optical paths of the laser beams.

Since the reflecting surface 20a of the biaxially movable mirror 20 is a concave surface, an angle formed by a light beam incident on the reflecting surface 20a and a reflected light beam changes with the incident position of a laser beam. For example, the relationship among an angle α1 formed by a light beam incident on the approximate center of the reflecting surface 20a and a light beam reflected therefrom, an angle α2 formed by a light beam incident on a position shifted to one side from the approximate center of the reflecting surface 20a and a light beam reflected therefrom, and an angle α3 formed by a light beam incident on a position shifted to the other side from the approximate center of the reflecting surface 20a and a light beam reflected therefrom is α2<α1<α3.

Accordingly, the laser beams whose optical paths have shifted by vibration of the return mirror 4 change the course in the concentration direction by reflection on the reflecting surface 20a.

Furthermore, if the curvature of the reflecting surface 20a, which is a concave surface, is set such that laser beams approximately concentrate on a position assumed when the screen 11 is disposed, the positional deviation of the irradiated position of laser beams on the screen 11 can be suppressed to the minimum. As a result, the quality of an image can be secured. In addition, since incident angles β1, β2, and β3 of laser beams onto the screen 11 also change, a speckle pattern occurring when laser beams are irradiated onto the screen 11 can be changed. Accordingly, if the vibrating device 3 is made to operate while an image is being displayed on the screen 11, a plurality of speckle patterns can be superimposed on a viewer's retina. As a result, the speckle noise can be reduced. Here, the 'position assumed when the screen 11 is disposed' means a position corresponding to the standard of a projection allowable distance of the image display apparatus 1. For example, when a predetermined width is given for the projection allowable distance, the curvature of the reflecting surface 20a is set such that laser beams approximately concentrate on the screen 11 when the screen 11 is disposed at a position at which the distance from the image display apparatus 1 is approximately in the middle of the predetermined width.

In addition, when the curvature direction of the concave surface and the direction in which a laser beam shifts are the same direction, the speckle noise can be reduced while suppressing deviation of the irradiated position of the laser beam. In the first embodiment, the concave surface is formed such that the curvature direction of the concave surface is the Z-axis direction. However, the curvature direction of the concave surface may be any direction. By matching the shift direction of the optical path with the curvature direction, deviation of the irradiated position can be suppressed while changing the incident angle of a laser beam onto the irradiated surface. As a result, it is possible to secure the image quality and to reduce the speckle noise.

Second Embodiment

Figure 4:
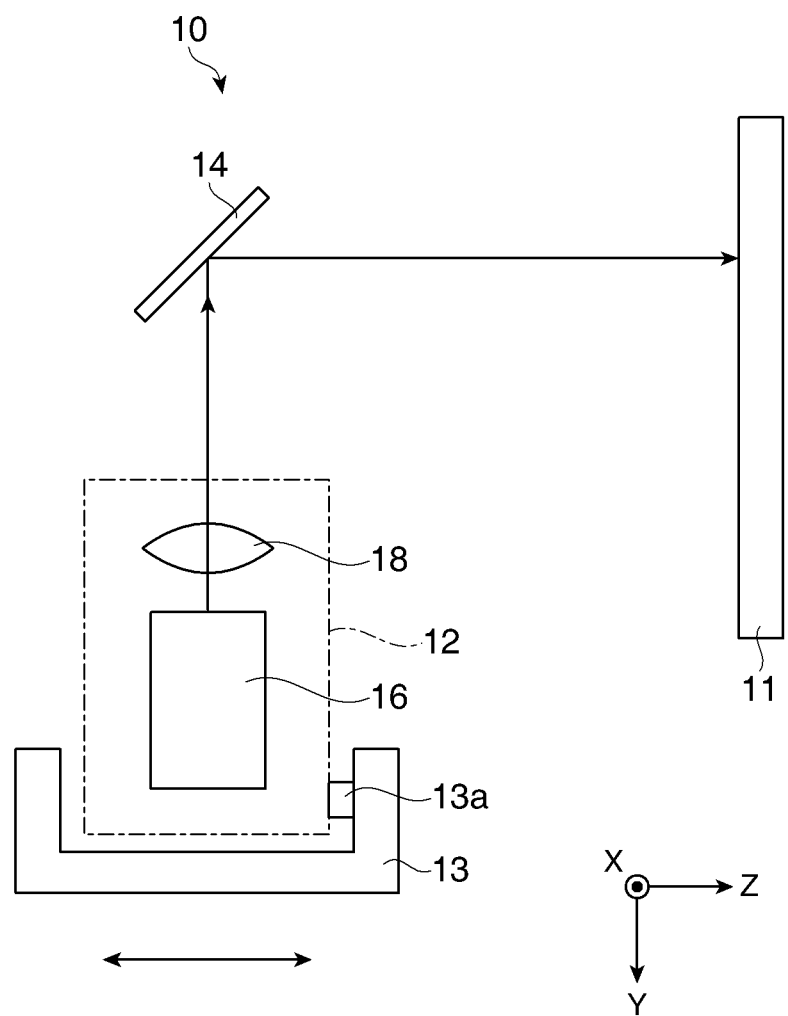
FIG. 4 is a schematic view illustrating the configuration of an image display apparatus according to a second embodiment of the invention.

FIG. 4 is a schematic view illustrating the configuration of an image display apparatus 10 according to a second embodiment of the invention. The second embodiment is characterized in that the optical path of a laser beam is shifted by vibrating a light source device 12. The same constituent components as in the first embodiment are denoted by the same reference numerals, and a repeated explanation thereof will be omitted. The image display apparatus 10 is configured to mainly include the light source device 12, a vibrating device (incident position changing unit, light source moving unit) 13, and a biaxial scanner (scanning portion) 14.

Since the light source device 12 has the same configuration as in the first embodiment, a detailed explanation thereof will be omitted. The light source device 12 is disposed such that a laser beam emitted from a semiconductor laser 16 moves toward the biaxial scanner 14. The vibrating device 13 has the piezoelectric element 13a and the like similar to the first embodiment, and a detailed explanation thereof will be omitted. Vibration of the light source device 12 causes the optical path of a laser beam emitted from the semiconductor laser 16 to be shifted in the Z-axis direction. The shift of the laser beam changes the incident position of the laser beam onto the reflecting surface (concave surface) 20a of the biaxial scanner 14. In addition, the vibration direction of the light source device 12 is set to be the curvature direction of a concave surface. Therefore, similar to the first embodiment, it is possible to prevent the image quality from lowering by suppressing deviation of the irradiated position by concentration of laser beams and to reduce a speckle noise by changing the incident angle of a laser beam onto the screen 11.

If the optical path of a laser beam traveling toward the reflecting surface 20a is shifted, deviation of the irradiated position can be suppressed while changing the incident angle of the laser beam onto the screen 11 by the operation of the concave surface formed on the reflecting surface 20a, similar to the first embodiment. As a result, the speckle noise can be reduced while securing the quality of an image displayed on the screen 11 by concentrating laser beams on the screen 11.

In the second embodiment, the optical paths of laser beams are shifted with a simple configuration of moving the light source device 12. Accordingly, the image display apparatus can be formed with a simple configuration without adding a new optical element. On the other hand, in the image display apparatus 1 according to the first embodiment, the return mirror is moved to shift the optical path of a laser beam. Since the mirror itself has only a function of reflecting light, an electric wiring line is not required. Accordingly, since there is no possibility that a wiring line will be disconnected by movement of the return mirror, the reliability of the image display apparatus can be secured.

In addition, the speckle noise can be reduced while suppressing deviation of the irradiated position of a laser beam if the curvature direction of the concave surface and the shift direction of the laser beam are the same direction. Also in the second embodiment, the concave surface is formed such that the curvature direction of the concave surface is the Z-axis direction. However, the curvature direction of the concave surface may be any direction. Since deviation of the irradiated position can be suppressed while changing the incident angle of a laser beam onto the irradiated surface by matching the shift direction of the optical path with the curvature direction, it is possible to secure the image quality and to reduce the speckle noise.

Third Embodiment

Figure 5:
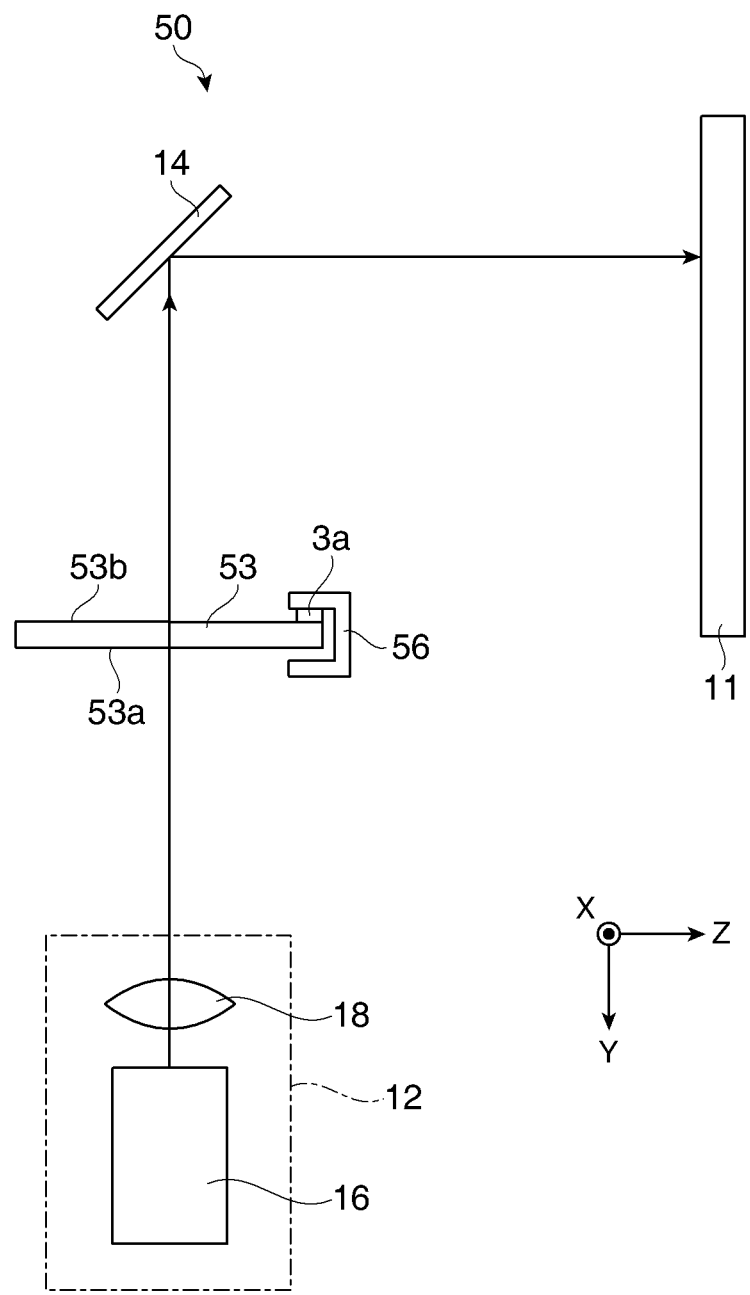
FIG. 5 is a schematic view illustrating the configuration of an image display apparatus according to a third embodiment of the invention.

FIG. 5 is a schematic view illustrating the configuration of an image display apparatus 50 according to a third embodiment of the invention. The third embodiment is characterized in that the optical path of a laser beam is shifted (converted) by a parallel plate (transmission portion) 53. The same constituent components as in the first embodiment are denoted by the same reference numerals, and a repeated explanation thereof will be omitted. The image display apparatus 50 is configured to include a light source device 12, the parallel plate 53, a rocking device (incident position changing unit, inclination changing unit) 56, and a biaxial scanner 14. The parallel plate 53 is located between the light source device 12 and the biaxial scanner 14 and is disposed on an optical path before a laser beam emitted from the light source device 12 is incident on the biaxial scanner 14. The parallel plate is a plate-like member formed of a transmissive material that allows light to be transmitted therethrough. Of the parallel plate 53, an incident surface 53a on which a laser beam is incident and an emission surface 53b from which the incident laser beam is emitted are parallel. When a laser beam is transmitted through the parallel plate 53, the laser beam is refracted on the incident surface 53a and the emission surface 53b.

Figure 6:
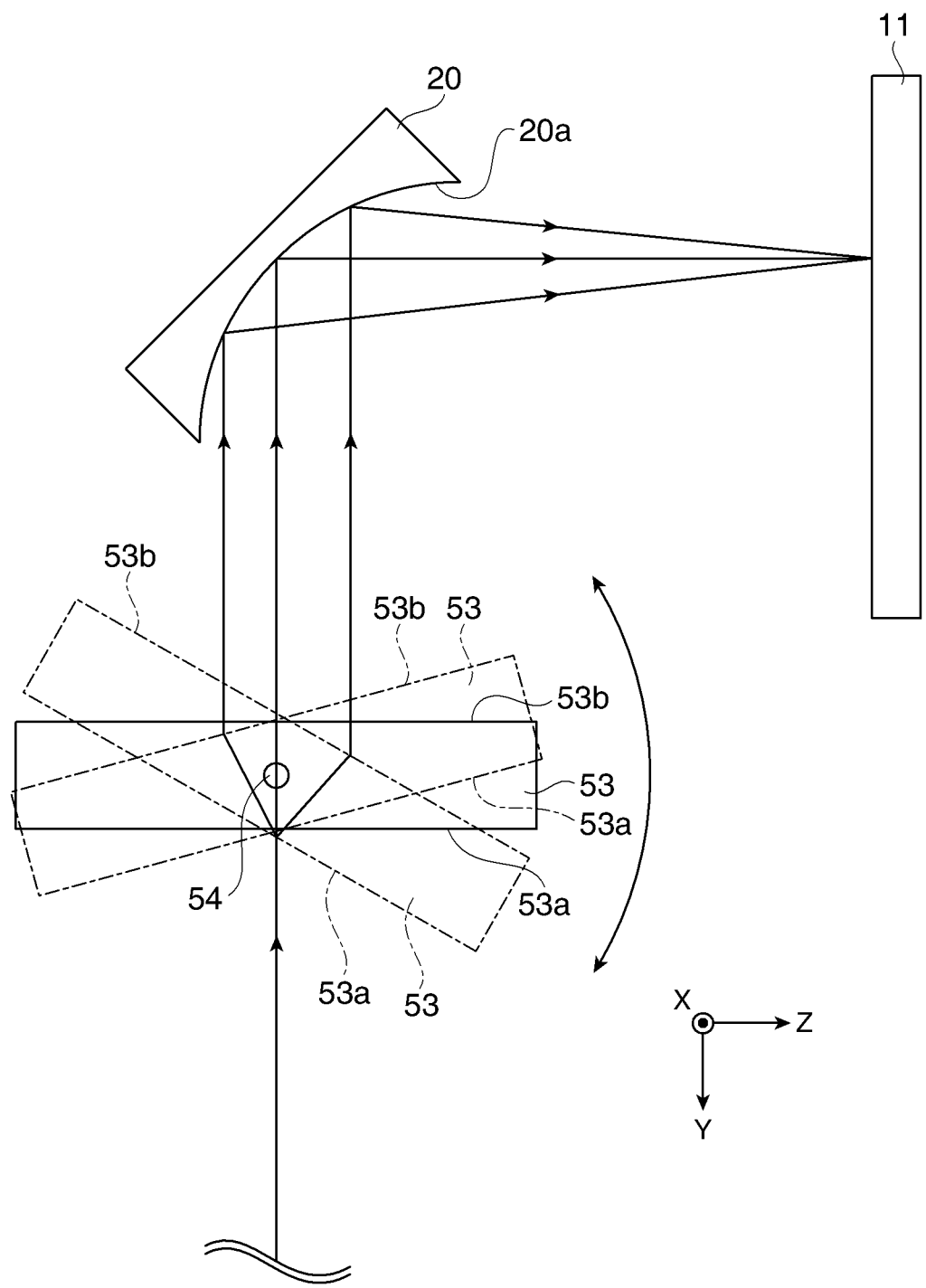
FIG. 6 is a schematic view illustrating optical paths of laser beams transmitted through a parallel plate.

FIG. 6 is a schematic view illustrating optical paths of laser beams transmitted through the parallel plate 53. The parallel plate 53 is rotatably supported on the rocking shaft 54 that extends in a direction (X-axis direction) approximately perpendicular to the optical paths of laser beams. In addition, the rocking device (incident position changing unit) 56 is disposed at the end of the parallel plate 53. The rocking device has a piezoelectric element 3a. By making the piezoelectric element 3a expand and contract by repeated application of a voltage to the piezoelectric element 3a, the end of the parallel plate 53 can be made to reciprocate. When the end 53c of the parallel plate 53 is made to reciprocate by the rocking device 56, the parallel plate 53 rocks within a predetermined angle range around the rocking shaft 54. When the parallel plate 53 rocks around the rocking shaft 54, the inclination of the incident surface 53a and the inclination of the emission surface 53b with respect to a laser beam change. The change in the inclination of the incident surface 53a and the inclination of the emission surface 53b shifts the optical path of the laser beam, which has been transmitted through the parallel plate 53, in the Z-axis direction.

If the optical path of a laser beam traveling toward the biaxial scanner 14 is shifted, deviation of the irradiated position can be suppressed while changing the incident angle of the laser beam onto the screen 11 by the operation of the concave surface formed on the biaxially movable mirror 20, similar to the first embodiment. As a result, the speckle noise can be reduced while preventing the quality of an image displayed on the screen 11 from lowering by concentrating laser beams on the screen 11. In addition, although the parallel plate 53 is made to rock by the rocking device 56 in the third embodiment, the parallel plate 53 may be made to rotate using a motor or the like.

Fourth Embodiment

Figure 7:
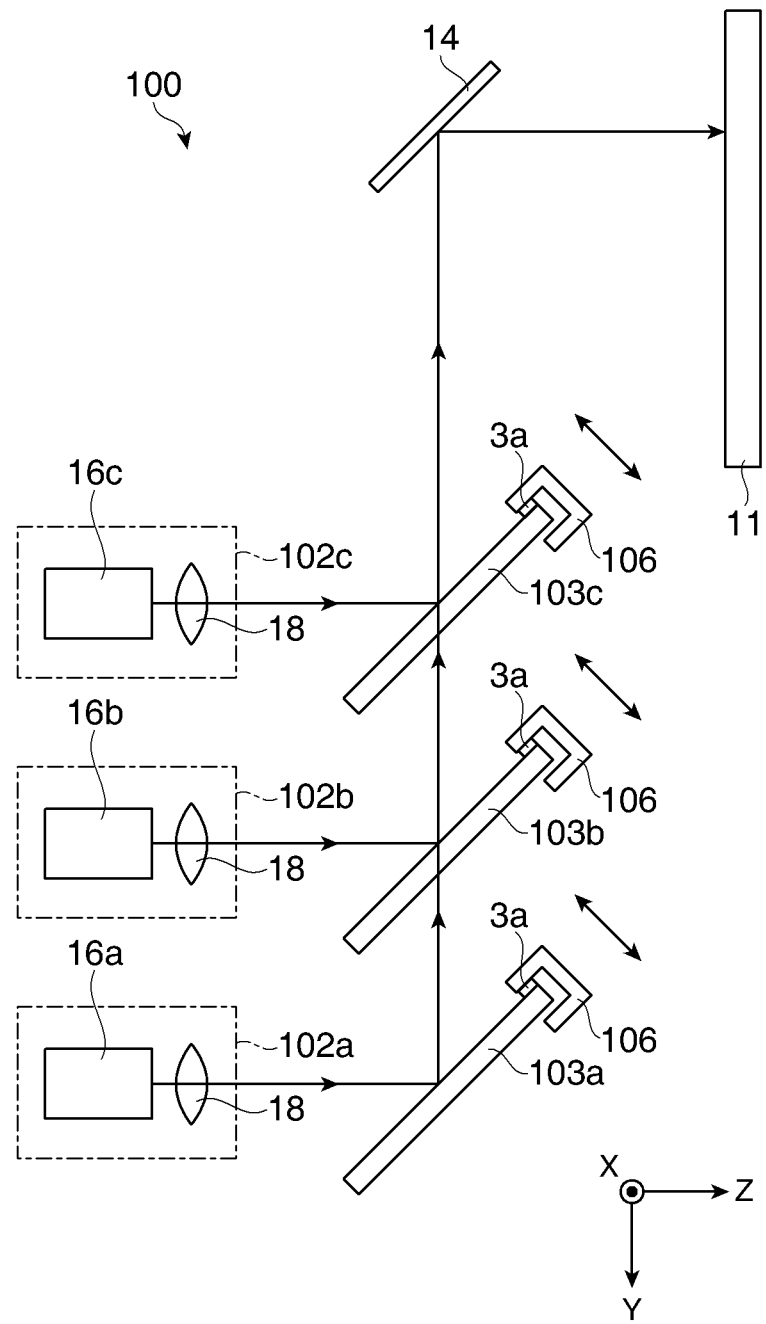
FIG. 7 is a schematic view illustrating the configuration of an image display apparatus according to a fourth embodiment of the invention.

FIG. 7 is a schematic view illustrating the configuration of an image display apparatus 100 according to a fourth embodiment of the invention. The fourth embodiment is characterized in that optical paths of laser beams are shifted (converted) by return mirrors (return reflection portions) 103a, 103b, and 103c formed by dichroic mirrors. The same constituent components as in the first embodiment are denoted by the same reference numerals, and a repeated explanation thereof will be omitted. Moreover, in the fourth embodiment, mixing of red (R) light, green (G) light, and blue (B) light will also be described.

The image display apparatus 100 is configured to include a light source device 102a for B light, a light source device 102b for G light, a light source device 102c for R light, the return mirror 103a for B light, the return mirror 103b for G light, the return mirror 103c for R light, a biaxial scanner 14, and a vibrating device (incident position changing unit, return reflection portion moving unit) 106.

The light source device 102a for B light, the light source device 102b for G light, and the light source device 102c for R light (hereinafter, collectively referred to as light source devices for respective colors) are light source portions for emitting laser beams corresponding to B, G, and R colors which are coherent light. The laser beams are emitted from the light source device 102a for B light toward the return mirror 103a for B light, from the light source device 102b for G light toward the return mirror 103b for G light, and from the light source device 102c for R light toward the return mirror 103c for R light. Since the light source devices 102a, 102b, and 102c for respective colors have the same configuration as the light source device 12 described in the first embodiment except that colors of laser beams emitted are specified, detailed explanations thereof will be omitted. In the fourth embodiment, the light source devices 102a, 102b, and 102c for respective colors are disposed such that laser beams emitted from the light source devices 102a, 102b, and 102c for respective colors are parallel.

The return mirror 103a for B light, the return mirror 103b for G light, and the return mirror 103c for R light (hereinafter, collectively referred to as return mirrors for respective colors) are formed by dichroic mirrors that make only light in a specific wavelength range reflected therefrom and light in the other wavelength range transmitted therethrough. The return mirror 103a for B light reflects B light therefrom. The return mirror 103b for G light transmits the B light therethrough and reflects G light therefrom. The return mirror 103c for R light transmits the G and B light therethrough and reflects R light therefrom. Each of the return mirrors 103a, 103b, and 103c for respective colors is formed such that a surface on which a laser beam is incident and a bottom surface are parallel. Furthermore, the return mirrors 103a, 103b, and 103c for respective colors are disposed in parallel such that top surfaces (bottom surfaces) thereof are parallel (hereinafter, a surface on which a laser beam emitted from each of the light source devices 102a, 102b, and 102c for respective colors is incident is referred to as a top surface and the opposite surface is referred to as a bottom surface).

A laser beam emitted from the light source device 102a for B light is reflected by the return mirror 103a for B light. The reflecting direction of the laser beam reflected by the return mirror 103a for B light is a direction traveling toward the return mirror 103b for G light.

A laser beam emitted from the light source device 102b for G light is reflected by the return mirror 103b for G light. The reflecting direction of the laser beam reflected by the return mirror 103b for G light is a direction traveling toward the return mirror 103c for R light.

The B light reflected by the return mirror 103a for B light is incident on a bottom surface of the return mirror 103b for G light. Since the return mirror 103b for G light reflects the G light therefrom, the B light is not reflected but transmitted through the return mirror 103b for G light. The B light transmitted through the return mirror 103b for G light travels through the return mirror 103c for R light in parallel with the G light reflected on a top surface of the return mirror 103b for G light.

The R light emitted from the light source device 102c for R light is reflected by the return mirror 103c for R light. The reflecting direction of the laser beam reflected by the return mirror 103c for R light is a direction traveling toward the biaxial scanner 14.

The G light reflected by the return mirror 103b for G light and the B light transmitted through the return mirror 103b for G light are incident on a bottom surface of the return mirror 103c for R light. Since the return mirror 103c for R light reflects the R light therefrom, the G and B light is not reflected but transmitted through the return mirror 103c for R light. The G and B light transmitted through the return mirror 103c for R light travels through the biaxial scanner 14 in parallel with the R light reflected on a top surface of the return mirror 103c for R light.

Since the biaxial scanner 14 has the same configuration as that in the first embodiment, a detailed explanation thereof will be omitted. The vibrating device 106 is attached to each of the return mirrors 103a, 103b, and 103c for respective colors and vibrates (moves) each of the return mirrors 103a, 103b, and 103c for respective colors in the normal direction of the top surface. The vibrating device 106 has the piezoelectric element 3a and the like similar to the first embodiment, and a detailed explanation thereof will be omitted.

Figure 8:
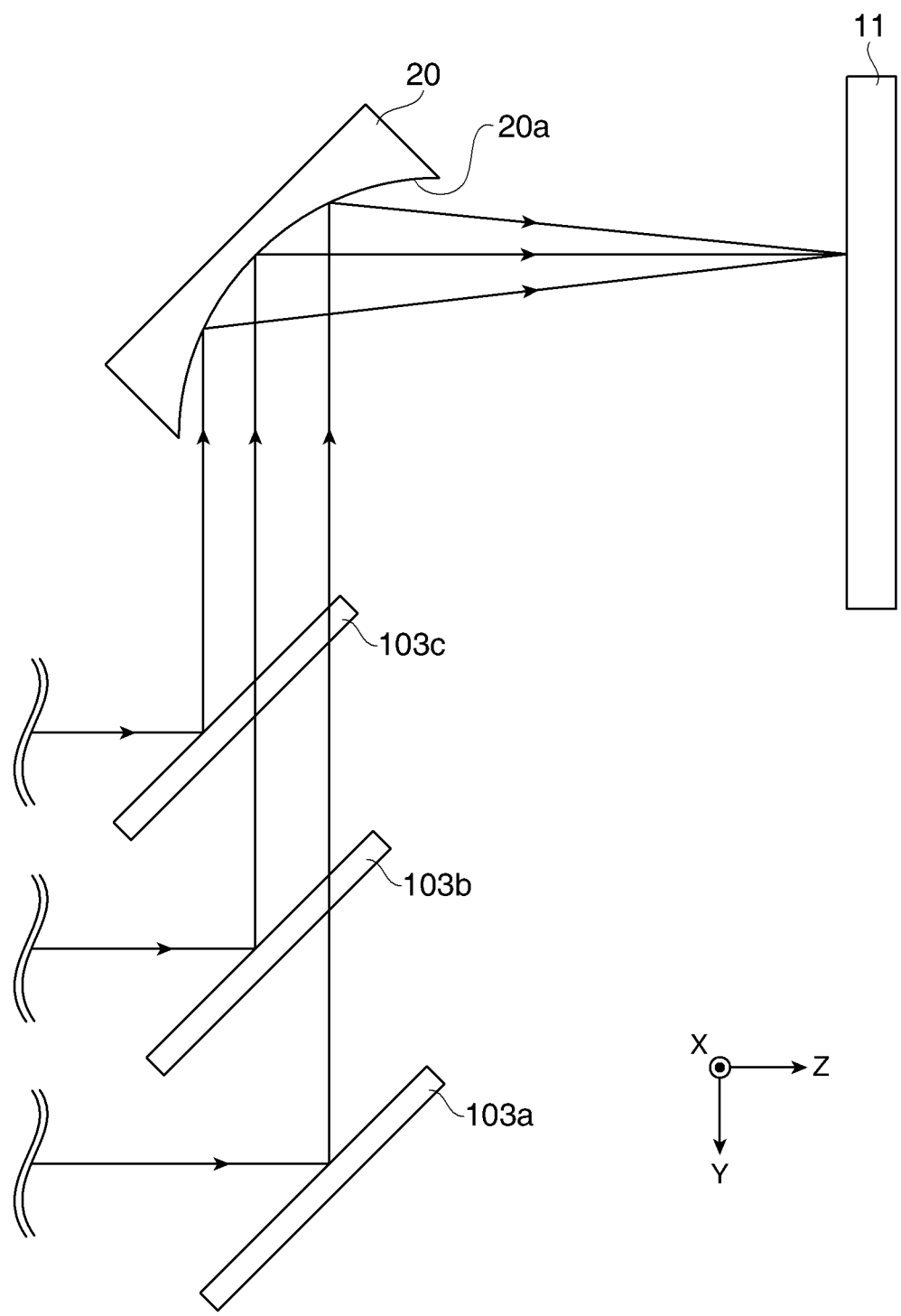
FIG. 8 is a schematic view illustrating optical paths of laser beams reflected by return mirrors.

FIG. 8 is a schematic view illustrating optical paths of laser beams transmitted through the return mirrors 103a, 103b, and 103c for respective colors. Since each of the return mirrors 103a, 103b, and 103c for respective colors vibrates by an operation of the vibrating device 106, a position of each of the return mirrors 103a, 103b, and 103c for respective colors at which a laser beam is reflected on the optical path of the laser beam changes. Accordingly, the optical path of the laser beam reflected by each of the return mirrors 103a, 103b, and 103c for respective colors is shifted (converted) in the Z-axis direction. If the optical paths of laser beams traveling toward the biaxial scanner are shifted, the laser beams concentrate by the operation of the concave surface formed in the biaxially movable mirror 20 so that deviation of the irradiated position can be suppressed, similar to the first embodiment. Accordingly, it is possible to prevent the quality of an image displayed on the screen 11 from lowering. In addition, the speckle noise can be reduced by changing the incident angle of a laser beam onto the screen 11.

If the emission position of B light incident from the bottom surface of the return mirror 103b for G light matches the reflection position of G light, colors of the laser beams are mixed before reaching the screen 11. Even if the incident position of a laser beam incident from the bottom surface of each of the return mirrors 103a, 103b, and 103c for respective colors does not match the reflection position of a laser beam on the top surface, colors of laser beams are mixed on the screen 11 because these laser beams concentrate at approximately one point on the screen 11. That is, it is not necessary to make the return mirrors 103a, 103b, and 103c for respective colors vibrate in synchronization with each other. In addition, even if the return mirrors 103a, 103b, and 103c for respective colors are made to vibrate irregularly, laser beams emitted from the light source devices 102a, 102b, and 102c for respective colors are mixed before reaching the screen 11 or at any point on the screen 11.

In addition, although the dichroic mirror is used as the return mirror 103a for B light in the fourth embodiment, a mirror that reflects light in a wide wavelength range including B light may be used as the return mirror 103a for B light since there is no laser beam incident from the bottom surface of the return mirror 103a for B light. Moreover, in the fourth embodiment, the light source devices 102a, 102b, and 102c for respective colors are disposed such that laser beams emitted from the light source devices 102a, 102b, and 102c for respective colors are parallel, the return mirrors 103a, 103b, and 103c for respective colors are formed such that top and bottom surfaces thereof are parallel, and the return mirrors 103a, 103b, and 103c for respective colors are disposed in parallel such that the top surfaces thereof are parallel. However, it is sufficient to configure the light source devices 102a, 102b, and 102c for respective colors and the return mirrors 103a, 103b, and 103c for respective colors such that laser beams corresponding to respective colors are parallel when the laser beams are incident on the concave surface, without being limited to that described above. For example, even if the top and bottom surfaces of each of the return mirrors 103a, 103b, and 103c for respective colors are not parallel, it is sufficient that light reflected on the top surface and light emitted from the top surface are parallel.

Fifth Embodiment

Figure 9:
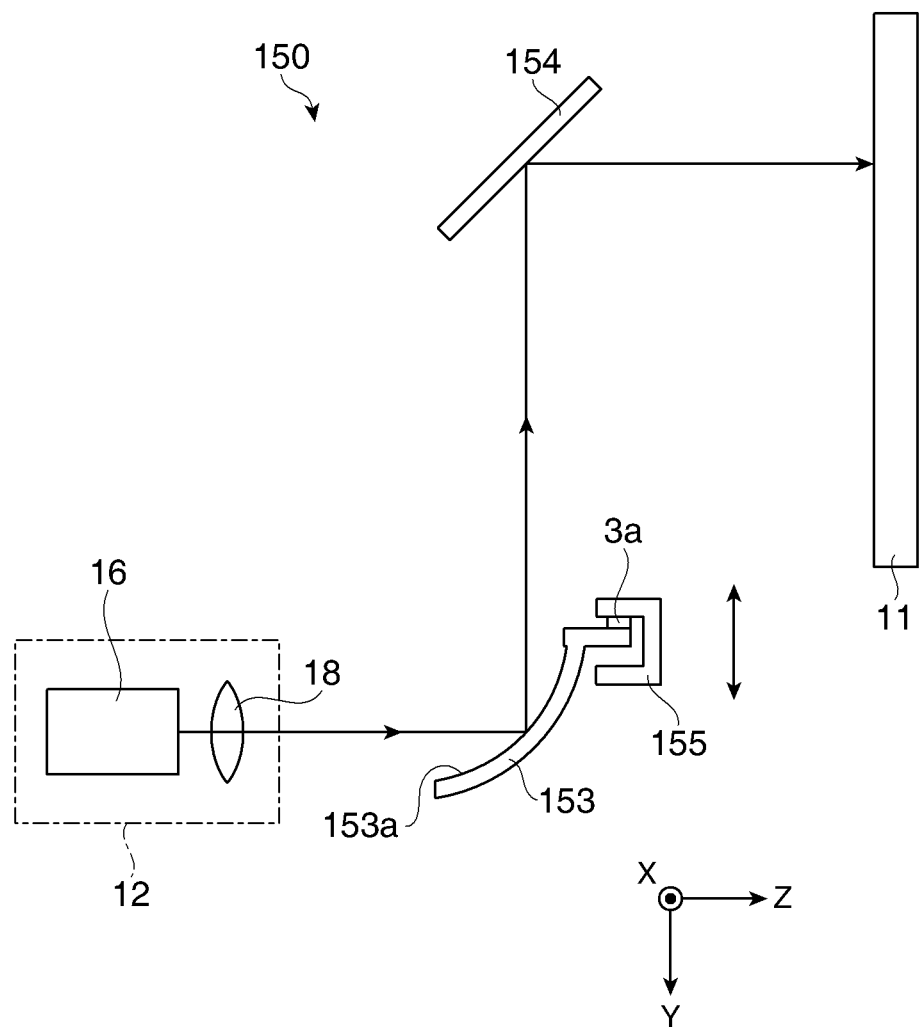
FIG. 9 is a schematic view illustrating the configuration of an image display apparatus according to a fifth embodiment of the invention.

FIG. 9 is a schematic view illustrating the configuration of an image display apparatus 150 according to a fifth embodiment of the invention. The same constituent components as in the first embodiment are denoted by the same reference numerals, and a repeated explanation thereof will be omitted. Similar to the first embodiment, the process of mixing color light components of red (R) light, green (G) light, and blue (B) light is also omitted. The fifth embodiment is characterized in that a concave surface is formed of a different member from a scanning portion.

The image display apparatus 150 is configured to include a light source device 12, a return mirror (concave reflection portion, return reflection portion) 153, a vibrating device (incident position changing unit, return reflection portion moving unit) 155, and a biaxial scanner (scanning portion) 154. Since the light source device 12 has the same configuration as that in the first embodiment, a detailed explanation thereof will be omitted.

The return mirror 153 reflects a laser beam emitted from the light source device 12 toward the biaxial scanner 154. The return mirror 153 is disposed on the optical path of the laser beam emitted from the light source device 12, and a reflecting surface 153*a* from which the laser beam is reflected is a cylindrical concave surface.

The vibrating device 155 vibrates (moves) the return mirror 153. The vibrating device 155 is attached to the end of the return mirror 153. The vibrating device 155 has a piezoelectric element 3*a* similar to the first embodiment, and the return mirror 153 vibrates by repeated application of a voltage to the piezoelectric element 3*a*. The vibration direction of the return mirror 153 by the operation of the vibrating device 155 is a direction (Y-axis direction) approximately perpendicular to the optical path of a laser beam emitted from the light source device 12.

Figure 10:
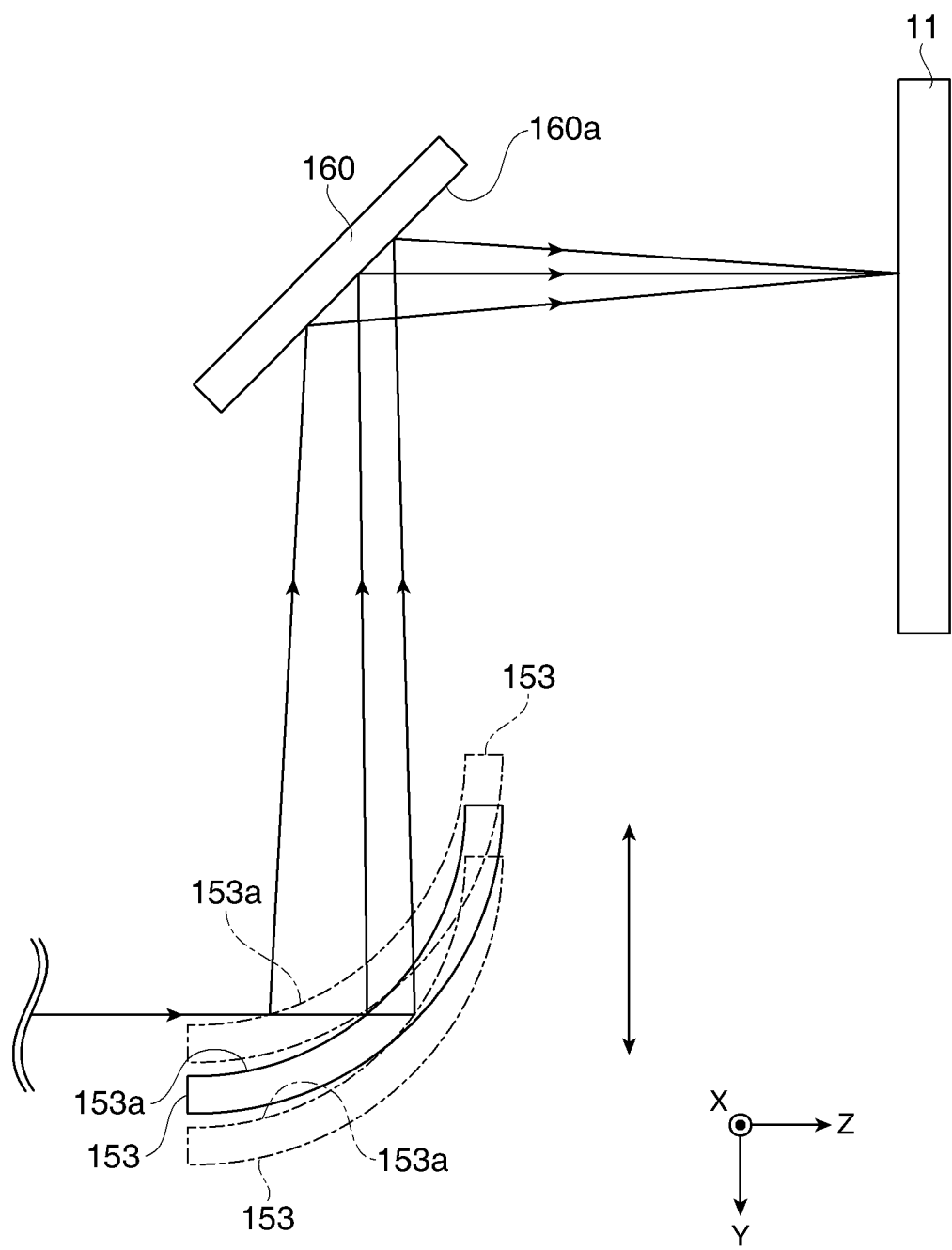
FIG. 10 is a schematic view illustrating optical paths of laser beams reflected by a return mirror.

FIG. 10 is a schematic view illustrating optical paths of laser beams reflected by the return mirror 153. Due to vibration of the return mirror 153, the incident position of a laser beam onto the reflecting surface 153*a* and the position at which the optical path of a laser beam is cut by the reflecting surface 153*a* change. Accordingly, the optical paths after reflection are shifted in the Z-axis direction by vibration of the return mirror 153. In addition, since the reflected surface is a concave surface, the optical paths are concentrated eventually.

Although the biaxial scanner 154 has approximately the same configuration as the biaxial scanner 14 in the first embodiment, the biaxial scanner 154 is different from the biaxial scanner 14 in the first embodiment in that a reflecting surface 160*a* of a biaxially movable mirror 160 is not a concave surface but a flat surface. The laser beam reflected by the return mirror 153 is further reflected on a reflecting surface of the biaxially movable mirror 160 to move toward the screen 11.

Therefore, similar to the first embodiment, it is possible to prevent the image quality from lowering by suppressing deviation of the irradiated position by concentration of laser beams and to reduce a speckle noise by changing the incident angle of a laser beam onto the screen 11.

In the fifth embodiment, the reflecting surface 153*a* which is a concave surface is formed on the return mirror 153 that moves linearly. Accordingly, compared with a case where a concave surface is formed on a member (for example, a scanning portion) that rotates or rocks, distortion of the concave surface caused by the moment can be suppressed. As a result, since it becomes easy to concentrate laser beams on the screen 11 with high precision, a high-quality image can be displayed for a viewer.

Moreover, in the fifth embodiment, the incident position of a laser beam onto the reflecting surface 153*a* is changed by vibrating the return mirror 153 formed with the concave surface. However, the invention is not limited thereto, but the incident position of a laser beam may also be changed by vibrating the light source device or by additionally providing a parallel plate and rocking the parallel plate as shown in FIG. 5.

Sixth Embodiment

Figure 11:
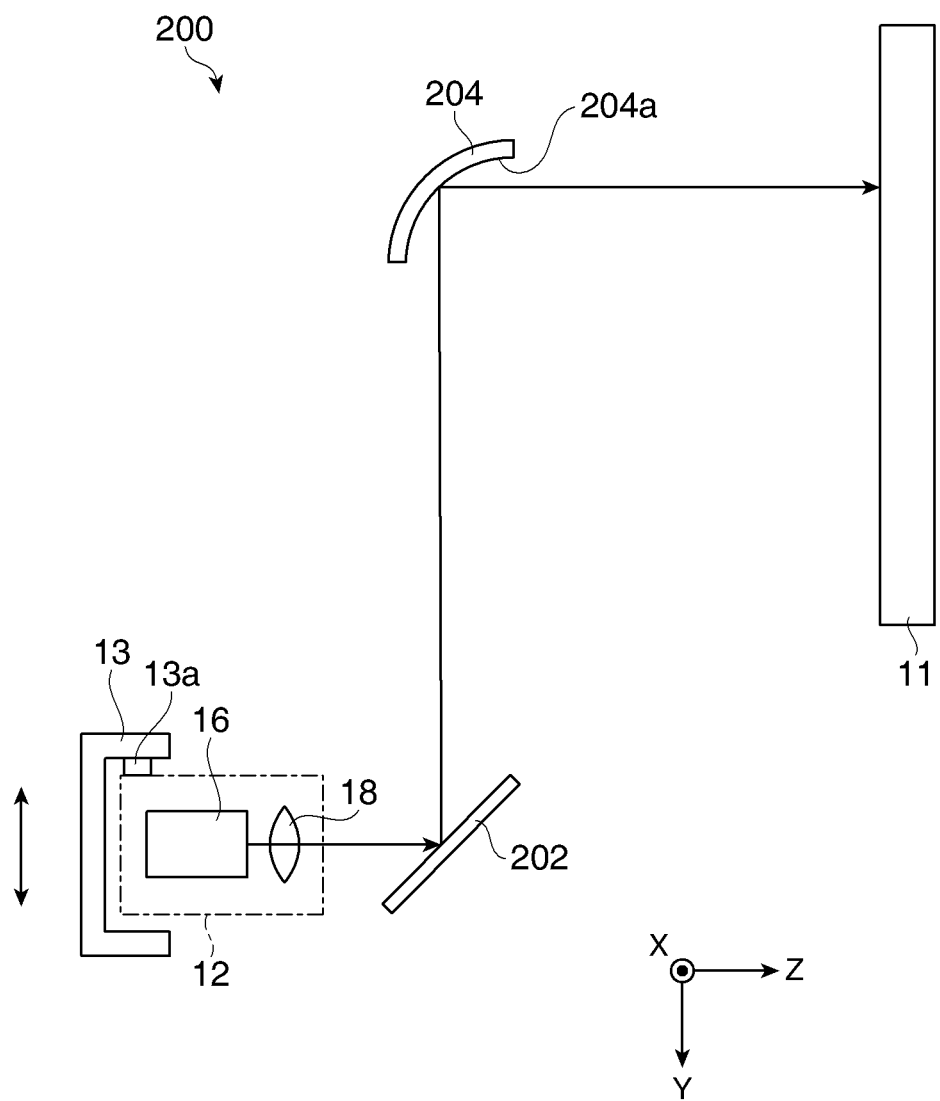
FIG. 11 is a schematic view illustrating the configuration of an image display apparatus according to a sixth embodiment of the invention.

FIG. 11 is a schematic view illustrating the configuration of an image display apparatus 200 according to a sixth embodiment of the invention. The same constituent components as in the first embodiment are denoted by the same reference numerals, and a repeated explanation thereof will be omitted. Similar to the first embodiment, the process of mixing color light components of red (R) light, green (G) light, and blue (B) light is also omitted. The image display apparatus 200 according to the sixth embodiment is characterized in that a scanning portion is configured to include a horizontal scanning mirror (first scanning portion) 202 and a vertical scanning mirror (second scanning portion) 204 and a reflecting surface 204*a* of the vertical scanning mirror 204 is a concave surface.

The image display apparatus 200 is configured to include a light source device 12, a vibrating device (incident position changing unit) 13, the horizontal scanning mirror 202, and the vertical scanning mirror 204. Since the light source device 12 has the same configuration as that in the first embodiment, a detailed explanation thereof will be omitted. The vibrating device 13 has the same configuration as that in the second embodiment and shifts an optical path of a laser beam incident on the reflecting surface 204*a* in the curvature direction (Z-axis direction) of the reflecting surface 204*a*.

The horizontal scanning mirror 202 reflects the laser beam emitted from the light source device 12 toward the vertical scanning mirror 204. Furthermore, the horizontal scanning mirror 202 has a function of rocking around the Y axis to thereby scan a laser beam in the horizontal direction (first direction).

The vertical scanning mirror 204 makes the laser beam, which has been reflected by the horizontal scanning mirror 202, further reflected toward the screen 11. Furthermore, the vertical scanning mirror 204 has a function of rocking around the X axis to thereby scan a laser beam in the vertical direction (second direction). Since the horizontal scanning mirror 202 and the vertical scanning mirror 204 cooperate to scan laser beams in the horizontal and vertical directions, a two-dimensional image can be displayed on the screen 11.

A cylindrical concave surface is formed on the reflecting surface 204*a* of the vertical scanning mirror 204. Since laser beams incident on the reflecting surface 204*a* are shifted in the curvature direction (Z-axis direction) by the operation of the vibrating device 13, the incident positions of laser beams onto the reflecting surface 204*a* also change. Since the concave surface is formed on the reflecting surface 204*a*, the laser beams are concentrated eventually even if the incident positions of the laser beams are different. Therefore, similar to the first embodiment, it is possible to prevent the image quality from lowering by suppressing deviation of the irradiated position by concentration of laser beams and to reduce a speckle noise by changing the incident angle of a laser beam onto the screen 11.

In the sixth embodiment, a rocking period of the vertical scanning mirror 204 is longer than that of the horizontal scanning mirror 202. For example, when the number of pixels of an image displayed is 1024 pixels in the horizontal direction and 768 pixels in the vertical direction, the horizontal scanning mirror 202 scans a laser beam 1024 times in the horizontal direction while the vertical scanning mirror 204 scans a laser beam once in the vertical direction. Since a concave surface is formed on the reflecting surface 204*a* of the vertical scanning mirror 204 that rocks at lower speed than the horizontal scanning mirror 202, there is little influence of the moment applied to the concave surface. Accordingly, concentration of laser beams on the screen 11 can be performed with high precision.

When the scanning portion is configured to be divided into the first scanning portion rocking in a first direction (for example, horizontal direction) and the second scanning portion rocking in a second direction (for example, vertical direction approximately perpendicular to the first direction) like the sixth embodiment, the incident position of a laser beam onto the second scanning portion changes with rocking of the first scanning portion. Accordingly, in case of forming a concave surface on the second scanning portion, the angle of reflection of a laser beam scanned by the first scanning portion on the second scanning portion is influenced by the curvature when the curvature direction of the concave surface and the first direction are parallel. Since the angle of reflection of a laser beam on the second scanning portion is influenced by the curvature, it becomes difficult to control the scanning position of the laser beam. As a result, an image displayed on the screen 11 is easily distorted. For this reason, in case of forming a concave surface on the second scanning portion, it is desirable to set the curvature direction of the concave surface as a direction approximately perpendicular to the first direction.

Moreover, in the sixth embodiment, the incident position of a laser beam onto the concave surface is changed by vibrating the light source device 12. However, the invention is not limited thereto, but the incident position of a laser beam may also be changed by additionally providing a return mirror and vibrating the return mirror as shown in FIG. 1 or by additionally providing a parallel plate and rocking the parallel plate as shown in FIG. 5.

Seventh Embodiment

Figure 12:
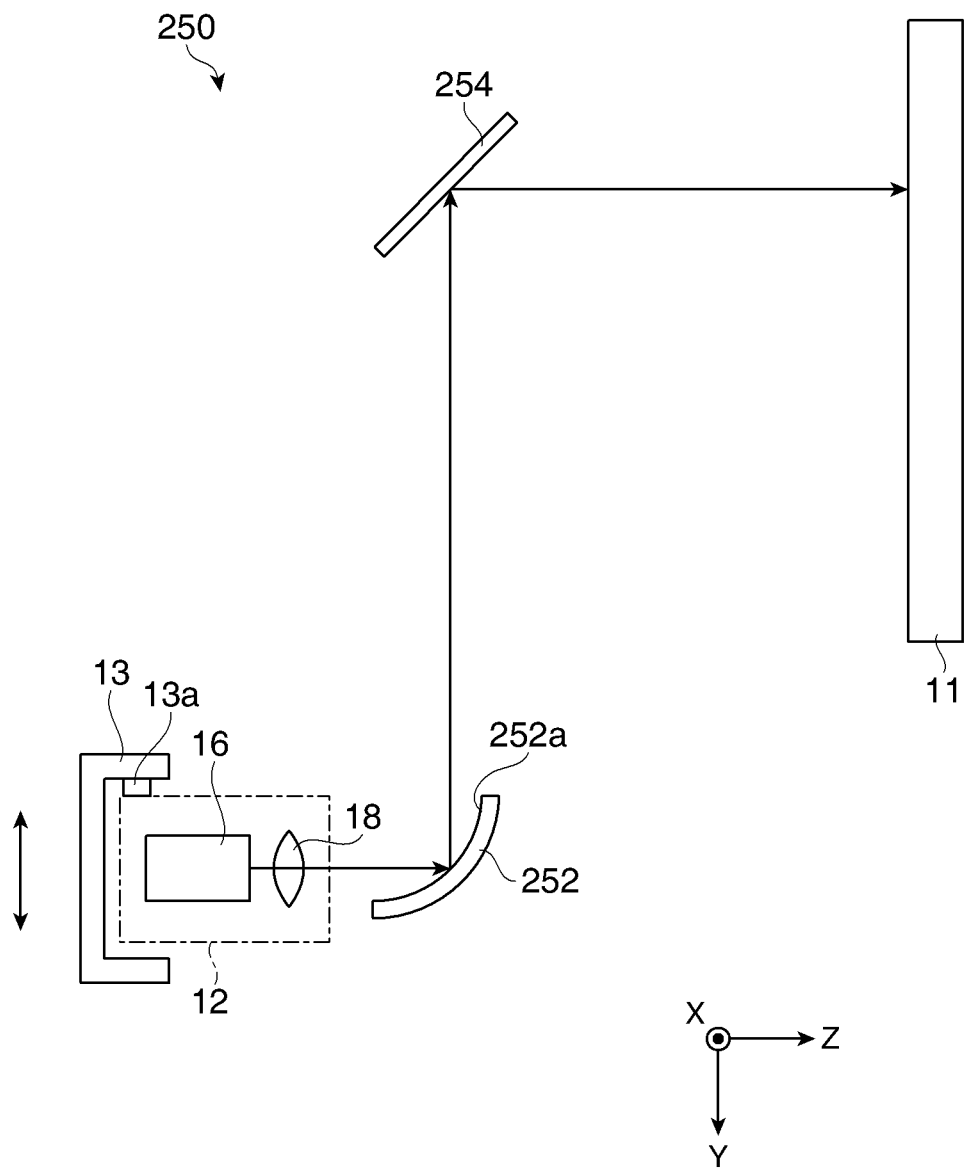
FIG. 12 is a schematic view illustrating the configuration of an image display apparatus according to a seventh embodiment of the invention.

FIG. 12 is a schematic view illustrating the configuration of an image display apparatus 250 according to a seventh embodiment of the invention. The same constituent components as in the first embodiment are denoted by the same reference numerals, and a repeated explanation thereof will be omitted. Similar to the first embodiment, the process of mixing color light components of red (R) light, green (G) light, and blue (B) light is also omitted. The image display apparatus 250 according to the seventh embodiment is characterized in that a scanning portion is configured to include a horizontal scanning mirror (first scanning portion) 252 and a vertical scanning mirror (second scanning portion) 254 and a reflecting surface 252a of the horizontal scanning mirror 252 is a concave surface.

The image display apparatus 250 is configured to include a light source device 12, a vibrating device (incident position changing unit) 13, the horizontal scanning mirror 252, and the vertical scanning mirror 254. Since the light source device 12 has the same configuration as that in the first embodiment, a detailed explanation thereof will be omitted. The vibrating device 13 has the same configuration as that in the second embodiment and shifts an optical path of a laser beam, which is emitted from the light source device 12, in the curvature direction (Y-axis direction) of the reflecting surface 252a which will be described later.

The horizontal scanning mirror 252 reflects the laser beam emitted from the light source device 12 toward the vertical scanning mirror 254. Furthermore, the horizontal scanning mirror 252 has a function of rocking around the Y axis to thereby scan a laser beam in the horizontal direction.

The vertical scanning mirror 254 makes the laser beam, which has been reflected by the horizontal scanning mirror 252, further reflected toward the screen 11. Furthermore, the vertical scanning mirror 254 has a function of rocking around the X axis to thereby scan a laser beam in the vertical direction. Since the horizontal scanning mirror 252 and the vertical scanning mirror 254 cooperate to scan laser beams in the horizontal and vertical directions, a two-dimensional image can be displayed on the screen 11.

A cylindrical concave surface is formed on the reflecting surface 252a of the horizontal scanning mirror 252. Since laser beams incident on the reflecting surface 252a are shifted in the curvature direction (Y-axis direction) by the operation of the vibrating device 13, the incident positions of laser beams onto the reflecting surface 252a also change. Since the concave surface is formed on the reflecting surface 252a, the laser beams are concentrated eventually even if the incident positions of the laser beams are different. Therefore, similar to the first embodiment, it is possible to prevent the image quality from lowering by suppressing deviation of the irradiated position by concentration of laser beams and to reduce a speckle noise by changing the incident angle of a laser beam onto the screen 11.

In the seventh embodiment, a rocking period of the horizontal scanning mirror 252 is shorter than that of the vertical scanning mirror 254. For example, when the number of pixels of an image displayed is 1024 pixels in the horizontal direction and 768 pixels in the vertical direction, the horizontal scanning mirror 252 scans a laser beam 1024 times in the horizontal direction while the vertical scanning mirror 254 scans a laser beam once in the vertical direction. The horizontal scanning mirror 252 rocking at higher speed than the vertical scanning mirror 254 is formed by a small member (for example, a MEMS mirror) in many cases. Since the horizontal scanning mirror 252 is small, the concave surface formed on the reflecting surface 252a is also small. Since the concave surface is small, an influence (for example, variation in the reflecting direction) caused by making the reflecting surface 252a have the curvature can be suppressed. As a result, distortion of an image displayed on an irradiated surface can be reduced irrespective of the curvature direction of the concave surface.

Moreover, in the seventh embodiment, the incident position of a laser beam onto the concave surface is changed by vibrating the light source device 12. However, the invention is not limited thereto, but the incident position of a laser beam may also be changed by additionally providing a return mirror and vibrating the return mirror as shown in FIG. 1 or by additionally providing a parallel plate and rocking the parallel plate as shown in FIG. 5.

Eighth Embodiment

Figure 13:
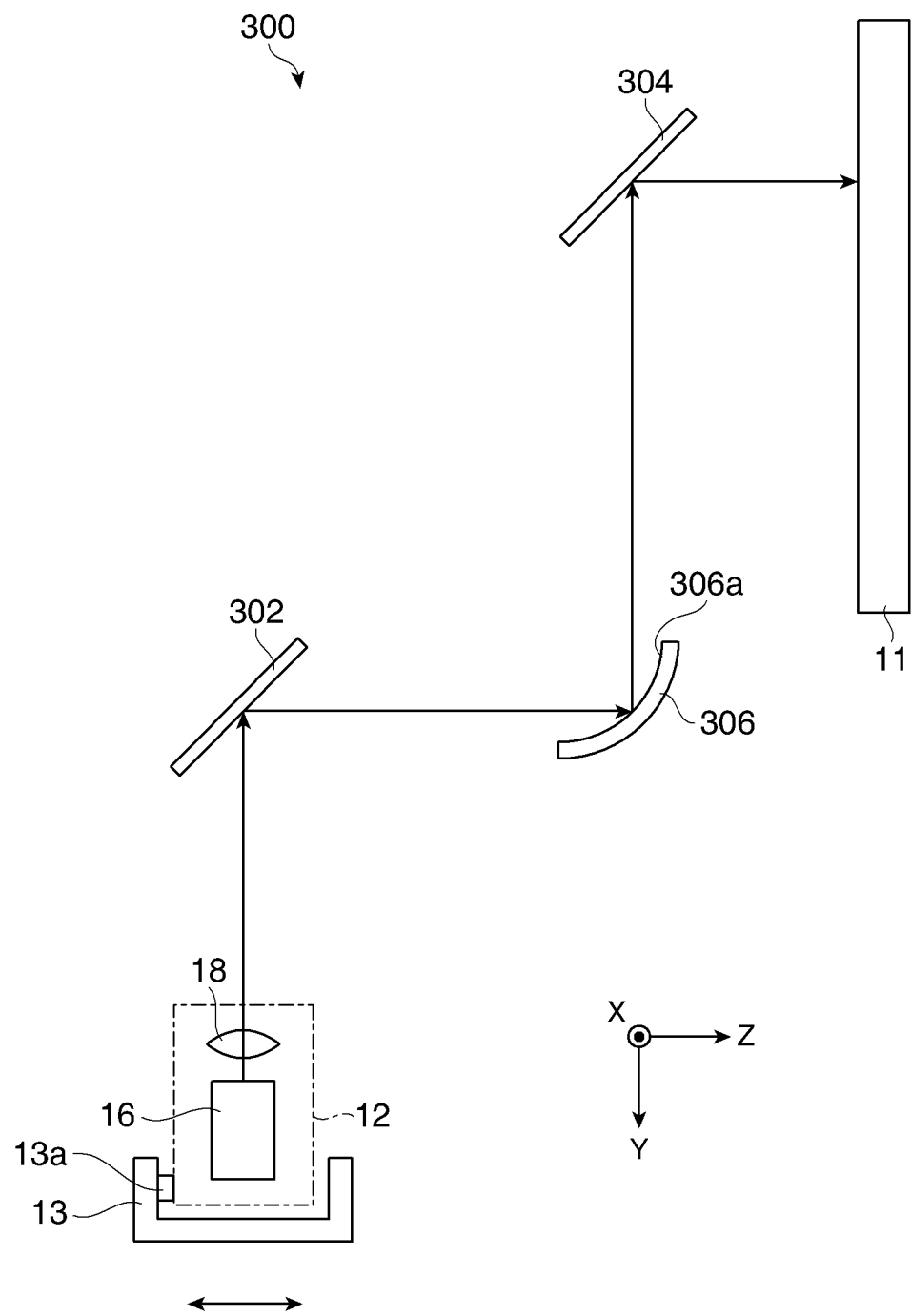
FIG. 13 is a schematic view illustrating the configuration of an image display apparatus according to an eighth embodiment of the invention.

FIG. 13 is a schematic view illustrating the configuration of an image display apparatus 300 according to an eighth embodiment of the invention. The same constituent components as in the first embodiment are denoted by the same reference numerals, and a repeated explanation thereof will be omitted. Similar to the first embodiment, the process of mixing color light components of red (R) light, green (G) light, and blue (B) light is also omitted. The image display apparatus 300 according to the eighth embodiment is characterized in that a scanning portion is configured to include a horizontal scanning mirror (first scanning portion) 302, a vertical scanning mirror (second scanning portion) 304, and a return mirror within a scanning portion (concave reflection portion, return reflection portion within a scanning portion) 306 and the return mirror within a scanning portion 306 formed with a reflecting surface 306a as a concave surface is disposed on the optical path between the horizontal scanning mirror 302 and the vertical scanning mirror 304.

The image display apparatus 300 is configured to include a light source device 12, a vibrating device (incident position changing unit) 13, the horizontal scanning mirror 302, the return mirror within a scanning portion 306, and the vertical scanning mirror 304. Since the light source device 12 has the same configuration as that in the first embodiment, a detailed explanation thereof will be omitted. The vibrating device 13 has the same configuration as that in the second embodiment and shifts an optical path of a laser beam, which is emitted from the light source device 12, in the curvature direction (Y-axis direction) of the reflecting surface 306a which will be described later.

The horizontal scanning mirror 302 reflects the laser beam emitted from the light source device 12 toward the return mirror within a scanning portion 306. The horizontal scanning mirror 302 has a function of rocking around the Y axis to thereby scan a laser beam in the horizontal direction.

The return mirror within a scanning portion 306 makes the laser beam, which has been reflected by the horizontal scanning mirror 302, further reflected toward the vertical scanning mirror 304. A cylindrical concave surface is formed on the reflecting surface 306a of the return mirror within a scanning portion 306. Since laser beams incident on the reflecting surface 306a are shifted in the curvature direction (Y-axis direction) by the operation of the vibrating device 13, the incident positions of laser beams onto the reflecting surface 306a also change. Since the concave surface is formed on the reflecting surface 306a, the laser beams are concentrated eventually even if the incident positions of the laser beams are different. Therefore, similar to the first embodiment, it is possible to prevent the image quality from lowering by suppressing deviation of the irradiated position by concentration of laser beams and to reduce a speckle noise by changing the incident angle of a laser beam onto the screen 11.

The vertical scanning mirror 304 makes the laser beam, which has been reflected by the return mirror within a scanning portion 306, reflected toward the screen 11. The vertical scanning mirror 304 has a function of rocking around the X axis to thereby scan a laser beam in the vertical direction. Since the horizontal scanning mirror 302 and the vertical scanning mirror 304 cooperate to scan laser beams in the horizontal and vertical directions, a two-dimensional image can be displayed on the screen 11.

In the eighth embodiment, the concave surface is formed on the return mirror within a scanning portion 306 which is not related to scanning of laser beams, that is, which does not perform a rocking operation. Since the return mirror within a scanning portion 306 does not rock, the concave surface is not bent by the moment. Accordingly, since it can be prevented that coherent light is dispersed by bending of the concave surface, it is possible to prevent the display quality from lowering.

A larger member than the horizontal scanning mirror 302 or the vertical scanning mirror 304 is used as the return mirror within a scanning portion 306, which is not related to scanning of coherent light, in many cases. As a result, since it becomes easy to form a concave surface on the return mirror within a scanning portion 306, the manufacturing cost can be suppressed.

When the scanning portion is configured to include the first scanning portion that scans a laser beam in a first direction (for example, horizontal direction), the second scanning portion that scans a laser beam in a second direction (for example, vertical direction approximately perpendicular to the first direction), and the return mirror within a scanning portion disposed on the optical path between the first and second scanning portions like the eighth embodiment, the incident position of a laser beam onto the return mirror within a scanning portion changes by rocking of the first scanning portion. Accordingly, in case of forming a concave surface on the return mirror within a scanning portion, the angle of reflection of a laser beam scanned by the first scanning portion on the return mirror within a scanning portion is influenced by the curvature when the curvature direction of the concave surface and the first direction are parallel. Since the angle of reflection of a laser beam on the return mirror within a scanning portion is influenced by the curvature, it becomes difficult to control the irradiated position of the laser beam. As a result, an image displayed on the screen 11 is easily distorted. For this reason, in case of forming a concave surface on the return mirror within a scanning portion disposed between the first and second scanning portions, it is desirable to set the curvature direction of the concave surface as a direction approximately perpendicular to the first direction.

Compared with the eighth embodiment, the return mirror within a scanning portion is not required between the first and second scanning portions in the sixth and seventh embodiments. Accordingly, since the number of constituent components can be reduced in the sixth and seventh embodiments, the manufacturing cost can be suppressed and the space can be saved.

Moreover, in the eighth embodiment, the incident position of a laser beam onto the concave surface is changed by vibrating the light source device 12. However, the invention is not limited thereto, but the incident position of a laser beam may also be changed by additionally providing a return mirror and vibrating the return mirror as shown in FIG. 1 or by additionally providing a parallel plate and rocking the parallel plate as shown in FIG. 5.

The entire disclosure of Japanese Patent Application No. 2008-94757, filed Apr. 1, 2008 is expressly incorporated by reference herein.

What is claimed is:

1. An image display apparatus that displays an image by scanning of coherent light, comprising:
    a light source portion that emits the coherent light;
    a concave reflection portion having a concave surface from which the coherent light emitted by the light source is reflected;
    a biaxial scanning portion that scans the coherent light reflected by the concave reflection portion along two directions; and
    an incident position changing unit that changes an incident position of the coherent light onto the concave surface in a curvature direction of the concave surface,
    wherein the incident position changing unit is a concave reflection portion moving unit that moves the concave reflection portion,
    wherein the moving direction of the concave reflection portion moving unit is approximately perpendicular to the direction at which the coherent light is incident on the concave reflection portion.

2. The image display apparatus according to claim 1, wherein the incident position changing unit is a light source moving unit that moves the light source portion.

3. The Image display apparatus according to claim 1, further comprising:
    a transmission portion that is disposed on an optical path of the coherent light before being incident on the concave surface and that transmits the coherent light therethrough,
    wherein the incident position changing unit is an inclination changing unit that changes the inclination of the transmission portion with respect to the coherent light.

4. The image display apparatus according to claim 1, wherein the concave reflection portion is a dichroic mirror.

5. The image display apparatus according to claim 1, wherein the concave reflection portion moving unit is a vibrating device which causes the concave reflection portion moving unit to vibrate.

* * * * *